United States Patent [19]

Hempel et al.

[11] 4,421,666
[45] * Dec. 20, 1983

[54] POWDERY ANTIFOAMING COMPOSITIONS FOR AQUEOUS SYSTEMS, THEIR PREPARATION AND USE

[75] Inventors: Hans-Ulrich Hempel, Overath; Edmund Schmadel, Leichlingen, both of Fed. Rep. of Germany

[73] Assignee: Henkel Kommanditgesellschaft auf Aktien, Dusseldorf-Holthausen, Fed. Rep. of Germany

[*] Notice: The portion of the term of this patent subsequent to Jul. 13, 1999 has been disclaimed.

[21] Appl. No.: 357,574

[22] Filed: Mar. 12, 1982

[30] Foreign Application Priority Data

Apr. 18, 1981 [DE] Fed. Rep. of Germany ....... 3115644

[51] Int. Cl.$^3$ .............................................. C11D 3/12
[52] U.S. Cl. .................. 252/140; 252/89.1; 252/174.15; 252/174.25; 252/321; 252/358
[58] Field of Search ................ 252/89.1, 140, 174.15, 252/174.25, 321, 358

[56] References Cited

U.S. PATENT DOCUMENTS

| | | | |
|---|---|---|---|
| 3,344,075 | 9/1967 | Scott | 252/321 |
| 3,408,300 | 12/1968 | Schlusser et al. | 252/156 |
| 3,408,306 | 10/1968 | Boylan | 252/321 |
| 3,629,122 | 12/1971 | Jakobi | 252/89 |
| 3,705,860 | 12/1972 | Duvall | 252/321 |
| 3,843,558 | 10/1974 | Farminer et al. | 252/321 |
| 4,123,378 | 10/1978 | Abel et al. | 252/171 |
| 4,192,761 | 3/1980 | Peltre et al. | 252/321 |
| 4,339,342 | 7/1982 | Hempel et al. | 252/174.25 |

FOREIGN PATENT DOCUMENTS 1204383 9/1970 United Kingdom .

*Primary Examiner*—Richard L. Schilling
*Assistant Examiner*—Robert A. Wax
*Attorney, Agent, or Firm*—Hammond & Littell, Weissenberger and Muserlian

[57] ABSTRACT

A free-flowing, substantially silicone-free, powdery antifoaming composition for use in aqueous systems comprised of:

(a) a liquid homogeneous mixture of a branched-chain primary $C_{16}$-$C_{30}$ alcohol and hydrophobic-reacting colloidal silicic acid with a ratio by weight of alcohol:silicic acid of 100:2 to 100:20, as obtained by heating to 100° to 240° C. with agitation for a time sufficient to obtain a homogeneous mixture, (b) a water-insoluble wax in a ratio by weight of (a):(b) of from 3:1 to 1:3, and (c) a water-soluble powdered carrier where the components (a) and (b) are present on the carrier in homogeneous distribution, the powdered carrier being present in such an amount that a free-flowing product results.

The primary alcohol of component (a) is preferably a Guerbet alcohol of the formula:

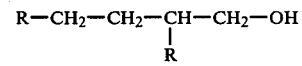

$R = C_4\text{-}C_{16}\text{—alkyl}.$

A natural or synthetic paraffin wax or mixture of waxes with a congealing point in the range of 40° to 120° C. is used preferably as the wax (b). The carrier (c) is a salt that is compatible with the aqueous system, especially an alkali metal salt from the group of the phosphates, the polymeric phosphates, the borates, carbonates, silicates, sulfates or their mixtures, preferably sodium tripolyphosphate. The product is prepared by mixing the liquid alcohol/silicic acid mixture (a) with the wax (b) and the carrier (c) at temperatures above the congealing point of the wax, cooling of the homogeneous mixture to room temperature with continued mixing and crushing into a free-flowing powder. The antifoaming agent is preferably used in washing and cleaning products in amounts from 0.15% to 15% by weight.

16 Claims, No Drawings

POWDERY ANTIFOAMING COMPOSITIONS FOR AQUEOUS SYSTEMS, THEIR PREPARATION AND USE

BACKGROUND OF THE INVENTION

The subject of the invention is a powdered, silicone-free antifoaming agent composition for aqueous systems, especially for washing and cleaning liquors as well as a process for the preparation of the new antifoaming agent. The subject of the invention is also the use of the antifoaming agent as foam inhibitor, especially in wash and cleaning products.

The problem of regulating the suds, or foaming, in aqueous systems that tend to develop excessive foam during agitation and/or heating already resulted in numerous suggestions for its solution and led to the development of a broad state of the art. Especially with the modern washing machines, and here above all the drum washers, the control of the formation of foam in the washing liquor is indispensable over the entire washing range since excessive foaming as well as the complete absence of suds are undesirable for the washing success. An excellent antifoaming agent was found in the soaps based substantially upon $C_{20}$ and $C_{22}$ fatty acids, as they are available from rapeseed oil and fish oils as natural sources. However, for various reasons a reliable supply of these raw materials cannot be ensured. Also, the required relatively high concentration in which these fatty acids must be used, which is on the order of from 2% to 3.5% by weight, based on the total weight of the finished detergent, is a disadvantage.

Known silicone foam inhibitors which consist of liquid polysiloxanes with alkyl or aryl substituents and finely-divided colloidal silica, effect desired suds control with very small amounts of the inhibitor, substantially below 1% by weight, and are in this respect superior to foam-inhibiting soaps. However, the high costs of the silicone foam inhibitors and also the great number of application technology parameters which must be observed for foam control, have led to further efforts in this field to make new silicone-free antifoaming compositions available. Liquid and solid hydrocarbons or chlorinated fatty alcohols, all fatty ketones, aliphatic disulfides or sulfoxides containing up to 50 carbon atoms, and the like, partly also in combination with hydrophobic, finely-divided silicon dioxide, have been suggested as foam-inhibiting active substances. For example, a special ternary foam inhibitor consisting of a liquid paraffin, a paraffin wax or an ester wax, and a hydrophobic-reacting silicon dioxide, has become known recently from the European Published Patent Application No. 0 000 216. This ternary mixture can be incorporated in the wash product by the usual methods. This antifoaming mixture can also be present, among other physical forms, as an agglomerate with conventional powdered wash product components. A ternary antifoaming mixture consisting of a hydrophilic, non-ionic dispersing agent with HLB-values of from 14 to 19 a hydrophobic-reacting silicic acid and a wax is known also from the European Published Patent Application No. 0 008 829.

This antifoaming agent intended for use in wash products is used as homogeneous dispersion that is mixed with a granulate of powdered wash product components. For this purpose, the antifoaming mixture can be changed from the heated, liquid form into a solid, finely divided form by cooling, for example, by spraying, and then mixed. The spraying of the warm, liquid antifoaming dispersion onto cold tower powder or cold granulate as carrier was recommended as alternative.

The preparation of a substantially silicone-free antifoaming agent for aqueous systems is also described in our commonly-assigned U.S. patent application Ser. No. 250,683, filed Apr. 3, 1981, now U.S. Pat. No. 4,339,342. In this process, a higher molecular-weight, branched chain, primary alcohol containing in principal from 18 to 30 carbon atoms is mixed with a colloidal, hydrophobic-reacting silicic acid at a ratio for alcohol:silicic acid of from 100:2 to 100:20, preferably from 100:3 to 100:10, and heated with agitation to temperatures between 100° and 240° C. for a time sufficient to give a homogeneous mixture, usually from one to five hours, preferably under an inert gas atmosphere. A homogeneous, liquid product is obtained upon subsequent cooling to room temperature. The practically silicone-free, antifoaming agent prepared by this method is particularly suitable for incorporation in washing and cleaning products by the usual finishing methods. Guerbet alcohols are used preferably as the branched-chain alcohols. The effectiveness of this antifoaming agent is comparable to that of known silicone-containing, antifoaming agents.

OBJECTS OF THE INVENTION

An object of the invention is the development of a substantially silicone-free, free-flowing, antifoaming powder.

Another object of the present invention is the development of a free-flowing, substantially silicone-free, powdery antifoaming composition for use in aqueous systems consisting essentially of:

(a) a liquid homogeneous mixture of a branched-chain primary $C_{16}$–$C_{30}$ alcohol and hydrophobic-reacting colloidal silicic acid with a ratio by weight of alcohol:silicic acid of 100:2 to 100:20, as obtained by heating to 100° to 240° C. with agitation for a time sufficient to obtain a homogeneous mixture, (b) a water-insoluble wax in a ratio by-weight of (a):(b) of from 3:1 to 1:3, and (c) a water-soluble powdered carrier where the components (a) and (b) are present on the carrier in homogeneous distribution, the powdered carrier being present in such an amount that a free-flowing product results.

It is a further object of the invention to provide a method of preparing such silicone-free, powdery antifoaming compositions.

It is a yet further object of the invention to provide for the use of such silicone-free, powdery antifoaming compositions with detergents and cleansers.

These and other objects of the invention will become more apparent in the discussion below.

DESCRIPTION OF THE INVENTION

It has now been discovered that the effectiveness of the antifoaming agent of Serial No. 250,683 could be further enhanced and the above objects could be achieved if the basic homogeneous mixture contained in addition a homogeneously distributed antifoaming additive, or it is converted together with the antifoaming additive into a free-flowing powdered product.

Consequently, the subject of the invention is an essentially silicone-free, powdery antifoaming agent composition for aqueous systems, which contains an organic silicone-free compound and a finely-dispersed, hydrophobic-reacting silicic acid, a wax and a water-soluble carrier, characterized in that it consists essentially of:

(a) a liquid, homogeneous mixture of a primary, branched-chain alcohol with 16 to 30 carbon atoms and a hydrophobic-reacting colloidal silicic acid, at a ratio of alcohol to silicic acid of 100:2 to 100:20, which was obtained by heating at 100° to 240° C. with agitation for from one to five hours, (b) a wax that is insoluble in water, in a quantitative ratio of (a) to (b) of 3:1 to 1:3, (c) a powdered water-soluble carrier substance, with the components (a) and (b) homogeneously distributed on the carrier (c) and the powdered carrier present in amounts that guarantee a free-flowing powdery product.

More particularly, the present invention involves a free-flowing, substantially silicone-free, powdery antifoaming composition for use in aqueous systems consisting essentially of:

(a) a liquid homogeneous mixture of a branched-chain primary $C_{16}$-$C_{30}$ alcohol and hydrophobic-reacting colloidal silicic acid with a ratio by weight of alcohol:silicic acid of 100:2 to 100:20, as obtained by heating to 100° to 240° C. with agitation for a time sufficient to obtain a homogeneous mixture, (b) a water-insoluble wax in a ratio by weight of (a):(b) of from 3:1 to 1:3, and (c) a water-soluble powdered carrier where the components (a) and (b) are present on the carrier in homogeneous distribution, the powdered carrier being present in such an amount that a free-flowing product results.

The mixing ratio of alcohol to silicic acid in component (a) is preferably 100:3 to 100:10 and the mixing ratio of the components (a) and (b) is 1:1 to 1:2.

A free-flowing powdery product is understood to mean a free-flowing powder that does not lump together and is thus easy to transfer, with the individual powder particles ranging from fine powder to coarse grains. Particle size and particle structure are essentially dependent on the original fineness of the powdered carrier as well as on the method by which the individual components were brought together.

Suitable hydrophobic-reacting silicic acids include all hydrophobic silicic acids or silicas with a specific surface area of at least about 50 m²/gm. In general, the value of the specific surface area is from about 100 to 300 m²/gm. These silicic acids consist of microfine silicon dioxide with an average primary particle size of about 5 mμ to about 50 mμ, as determined by the evaluation of electron-optical photography with particles of individual sizes in the range of from 3 mμ to 150 mμ. Such finely-divided silicic acids are obtained by flame hydrolysis or by precipitation. Making the silicic acids hydrophobic is usually effected by treatment with alkyl chlorosilanes, for example, dimethyldichlorosilane, trimethylchlorosilane, or cyclic or linear polydimethylsiloxanes.

The amount of siloxanes or silanes required to make the silicic acids hydrophobic is on the order of from about 4 to 6% by weight, based on the weight of the silicic acid. Based on the total weight of the powdery antifoaming compositions according to the invention, these amounts of silanes or siloxanes are in quantitative proportion which are far below 1% by weight of the powdery antifoaming composition, and are frequently considerably below 1 part per thousand by weight, so that the powdery antifoaming composition according to the invention can justifiably be considered as substantially silicone-free.

The higher molecular weight, branched-chain primary $C_{16}$-$C_{30}$-alcohols that are included as a constituent in the component (a) are technically easily accessible raw materials. More particularly, they are alkanols, alkenols and alkadienols. More particularly suitable are the so-called Guerbet alcohols, that is, single-branched, isoalcohols, which are technically readily obtainable by the Guerbet reaction from fatty alcohols. These Guerbet alcohols can be represented by the following general formula:

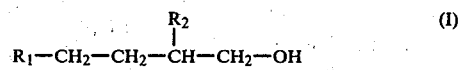

$$R_1-CH_2-CH_2-\overset{\overset{R_2}{|}}{CH}-CH_2-OH \qquad (I)$$

wherein $R_1$ and $R_2$, which can be identical or different, each represent an alkyl of from 4 to 16 carbon atoms. The Guerbet alcohols should have a total of from about 16 to 30 carbon atoms. The Guerbet alcohols used according to the invention can be homogeneous compounds or mixtures and preferably are liquid at room temperature.

In addition to the Guerbet alcohols, other primary alcohols with chain-branching, for example, products of the respective chain length accessible by the oxosynthesis, can also be used. However, it was found that strong antifoaming action and simple low cost accessibility of the starting materials are criteria that can be found combined and to an optimal degree in the Guerbet alcohols.

The preparation of the single-branched isoalcohols to be used according to the invention is known. Preparation of the Guerbet alcohols is described, for example, in German Published Application (DOS) No. 26 34 676. General information on the Guerbet reaction can be found, for example, in F. Asinger, Chemie und Technologie der Monoolefine, 1957, pages 547–548, and the bibliography cited therein.

It is particularly advantageous to use as the Guerbet alcohol starting material the so-called first-run of the fatty alcohols obtained in the commercial preparation from the natural fats, which alcohols are unsuitable for direct processing to prepare surfactants useful in the detergent industry. These are fatty alcohols obtained by hydrogenation of fatty acids with less than 12 carbon atoms, such as the compounds hexanol, octanol, and decanol. Consequently, the antifoaming compositions according to the invention have thus the advantage that they can be readily obtained from relatively cheap raw materials that are undesired by-products in the production of wash-active substances.

The highly effective foam inhibitors can also be obtained starting from fatty alcohols with 12 or more carbon atoms, which represent the most important raw materials for the production of wash-active substances, via the Guerbet reaction and the further processing according to the invention. However, their effectiveness is not greater than that of the so-called first-run fatty alcohols, so that there is no technical need only to use these longer chain fatty alcohols as raw materials. Preferred raw materials of the Guerbet alcohols are thus the chemically homogeneous compounds or mixtures where $R_1$ and $R_2$ in Formula I are alkyls of from $C_6$ to $C_{10}$, with emphasis on the frequency distribution at $C_8$, that is, with decanol as a starting substance.

Suitable waxes that are insoluble in water are a group of substances that, in principle, are also chemically built up of long chain linear molecular parts, which are, however, essentially characterized by their physical properties. The definition given in "Ullmanns Enzyclopädie der technischen Chemie" (Ullman's Encyclopedia of Technical Chemistry), 1967, Vol. 18, page 264, applies here, according to which "wax" is a technological, collective term for a number of naturally or synthetically obtained substances that generally can be kneaded at 20° C. and are solid or brittle but hard, coarsely to finely crystalline, translucent to opaque, but not vitreous, which melt above 40° C. without decomposition and without ropiness, have a highly temperature-dependent consistency and solubility and can be polished with slight pressure.

Consequently, these include natural, new waxes from plants or animals, natural fossil waxes that can be isolated from fossil materials, such as brown coal, peat and especially petroleum, as well as synthetic waxes that can be prepared, for example, by the Fischer-Tropsch process or by polymerization of ethylene, or thermal degradation of high molecular weight polyethylene. With respect to the chemical structure, the waxes are long chain hydrocarbons, that is, linear hydrocarbons, isoparaffins or ring-paraffins with side chains, but without any other functional groups, or they are ester, acid or alcohol waxes. Waxes are generally complex structures of substances without any well defined melting point. Therefore, the congealing point (CP) is frequently determined instead for their identification. This is the temperature range in which the wax changes from the liquid to the solid state with slow cooling. An important criterion for the suitability of waxes according to the invention is their property of having a congealing point in the range from 40° to 120° C., but especially from 60° to 95° C. This congealing point criterion, combined with the easy technical accessibility, make particularly the natural and synthetic paraffin waxes and their mixtures appear especially suitable.

Suitable as powdered, water-soluble carriers on which the alcohol/silicic acid mixture and the wax are present in homogeneous distribution are essentially those water-soluble salts that are compatible with the aqueous systems to be freed from foam. These are compounds that do not interfere with the intended course of these systems or which are of themselves suitable as components of these aqueous sytems. Consequently, these are especially the alkali metal salts of phosphates, particularly of the polymeric phosphates, as well as alkali metal borates, carbonates, silicates, sulfates and their mixtures. The alkali metal salts can be hydrated or calcined as starting materials. A carrier substance especially preferred for its good carrier properties is sodium tripolyphosphate, preferably in its calcined, that is, its anhydrous or only slightly hydrated form.

Since the antifoaming composition according to the invention is used in low overall concentrations, tripolyphosphate can still be used as carrier for those aqueous systems for which a very low phosphate content is stressed. A very suitable phosphate-free carrier is sodium sulfate, calcined or hydrated. Powdered alkali metal silicates, particularly hydrated sodium silicates prepared by drum-drying or spray-drying are also suitable as carriers. Mixtures of the mentioned salts, as spray-dried powders, and containing sodium tripolyphosphate, sodium silicate and sodium sulfate, for example, are equally suitable.

The powdered antifoaming compositions according to the invention are eminently suitable as foam inhibitors for aqueous systems in fields of application, such as the paper industry, petroleum refining, sugar refineries, textile industry, waste water treatment, also for cutting oil emulsions, distillation and flotation processes as well as especially for agitated and heated washing and cleaning liquors. The antifoaming compositions according to the invention are alkali-stable and are also not inactivated by aqueous alkali and tenside solutions. Consequently they are ideally suitable for incorporation in powdered but also in liquid washing and cleaning agents, by the conventional methods. An especially preferred variant is the incorporation of the powdered antifoaming composition in powdered washing and cleaning agents by mixing with a powdered premix prepared, for example, by spray-drying. The direct inclusion in the washing agent slurry to be further processed by spray-drying is also possible in principle, although this usually results in a partial loss of activity and makes the addition of larger initial amounts necessary.

The powdered antifoaming composition according to the invention generally contains from 2 to 20% by weight, preferably 4 to 15% by weight, of the above-defined component (a) and from 2 to 20% by weight, preferably 4 to 15% by weight, of the above-defined component (b). Both active components should be present in homogeneous distribution on the powdered carrier component (c) which is present in amounts of from 60 to 96% by weight. The requirement of homogeneity is of special significance for the proper action of the antifoaming agent. Homogeneity exists when care is taken, with the proper production conditions, that the branched alcohol/hydrophobic silicic acid and the wax are uniformly distributed in the final product, so that aliquot amounts of the wax and the branched alcohol/hydrophobic silicic acid are found in the analysis of a sample of the final product. For the analysis, a sample is dissolved in water. The solution extracted with n-hexane and after removal of the hexane, the total amount of the residue is determined and the hydroxyl number of the residue is determined.

The necessary homogeneity can be achieved by the observation of certain mixing conditions. Thus the invention also concerns a process for the preparation of above-defined, powdered antifoaming agent. This process is characterized in that:

(a) a branched-chain, primary alcohol with 16 to 30 carbon atoms and a colloidal hydrophobic-reacting silicic acid are homogenized at a mixing ratio for alcohol to silicic acid of 100:2 to 100:20 and heated to temperatures of 100° to 240° C. with continuous mixing for a time sufficient to effect homogenization, preferably from one to five hours, (b) a water-insoluble wax at a temperature above its congealing point, at a ratio of 3:1 to 1:3 with component (a), and (c) a water-soluble, powdered carrier present in an amount that guarantees a free-flowing powder product are mixed together to produce a homogeneous distribution of component (a) and (b) on the carrier.

The last homogenization is carried out in suitable mixers, for example, in a kneading machine. After homogenization, the mixture is cooled to room temperature, if desired with further mixing, and converted into a free-flowing, powdered product, for example, by crushing it mechanically or pressing it through a screen.

According to a preferred example of the process, the carrier material is first heated to a temperature above the congealing temperature of the wax that is to be used; then the prepared liquid alcohol/silicic acid mixture of component (a) is added and the two components are mixed until a homogeneous mass is formed. Depending on the size of the batch and mixer, the required times are approximately 10 to 30 minutes. Then, the warm, liquid wax, component (b) is added and the mass again mixed until homogeneous. After subsequent, continued mixing and allowing to cool to room temperature, the product of the process is obtained as solid mass, which is in the form of a free-flowing powder.

According to another process variation, which is also preferred, the liquid alcohol/silicic acid component (a) is first mixed with the liquefied wax (b), also using temperatures above the congealing point of the wax. The resulting liquid mixture is then mixed with the also heated carrier unit homogeneity is again achieved, generally proceeding by adding the liquid mixture of components (a) and (b) to the preheated solid carrier (c). This method of preparation again is completed by cooling with continuous mixing.

As explained before, the powdered antifoaming compositions according to the invention are especially suitable for incorporation in washing and cleaning products.

Another subject of the invention thus is the use of the products of the process as foam inhibitors in washing and cleaning products. Of special interest is the use in washing and cleaning products that are used in closed washing machines and dishwashers with strong mechanical agitation of the goods to be cleaned. As explained previously, additions of the powdered antifoaming composition according to the invention in small quantities to the washing and cleaning products are sufficient to control the foam development. Given the quantitative proportions of from 0.01 to 1% by weight and especially of from 0.05 to 0.2% by weight of the foam-inhibiting active substance of the alcohol/silicic acid component (a) defined above, and given quantitative proportions of the wax component (b) defined above in the same order of magnitude, the quantitative proportions of the powdered antifoaming agents present in the washing and cleaning products are in the range from 0.15 to 15% by weight, preferably from 0.8 to 4% by weight. Consequently, the products according to the invention are comparable to the most effective commerical silicone preparations with respect to their concentration of foam-inhibiting active substance to be used. Washing and cleaning products containing the foam inhibitor according to the invention can contain conventional anionic, nonionic, zwitterionic and, if needed, also cationic tensides with inherent strong foam formation, also water-soluble and water-insoluble builders, alkalies, bleaches as well as other additives that improve the washing and cleaning result or the application characteristics of the goods to be cleaned.

The following examples are intended to illustrate the invention and should not be construed as limiting the invention thereto.

EXAMPLES

The following examples describe first the preparation of the alcohol/silicic acid component (a) as described in Serial No. 250,683.

EXAMPLE 1

One hundred grams of 2-octyldodecanol ($R_1=R_2=C_8H_{17}$ in the compound of Formula I), commercially available as Eutanol G ® from Dehydag (index of refraction at 20° C.: 1.454–1.456), and 3.5 gm of pyrogenic silicic acid, made hydrophobic with dimethyldichlorosilane, with a BET-surface of 120 m$^2$/gm and a mean primary particle size of 16 m$\mu$ (Aerosil R ®972, available from Degussa), were homogenized at 900 to 1,000 rpm with a Pendraulik agitator (Pendraulik, Bad Münder, Fed. Republic of Germany) which was equipped with a toothed disk having a 50 mm diameter. Then, the mixture was heated with stirring in a nitrogen atmosphere for five hours at 240° C. The product obtained had a viscosity of 126 mPa.s at 20° C.

EXAMPLE 2

In Example 2, a product was obtained using a procedure similar to that of Example 1, with the exception that the mixture was heated only to 100° C. The viscosity of the product was 153 mPa.s (20° C.).

EXAMPLES 3 AND 4

Example 1 was repeated, except that instead of 3.5 gm of the silicic acid described in Example 1 being used, 5.0 gm and 8.0 gm, respectively, were used. The viscosities of the products prepared according to Examples 3 and 4 were 155 mPa.s and 579 mPa.s, respectively, at 20° C.

EXAMPLES 5 AND 6

One hundred grams of 2-octyldecanol were mixed with a precipitated silicic acid made hydrophobic with organochlorosilanes (BET-surface 110 m$^2$/gm, mean primary particle size 28/m$\mu$, commercially available under the tradename Sipernat ®D17 from Degussa), and treated as in Example 1. Amounts of 3.5 and 8.0 gm of precipitated silicic acid were used in Examples 5 and 6, respectively. The viscosities of the products at 20° C. were 71 mPa.s and 93 mPa.s, respectively.

EXAMPLE 7

From a commercial $C_{10}/C_{16}$ fatty alcohol a mixture of various Guerbet alcohols was prepared according to the method described in German Published Application (DOS) No. 26 34 676, incorporated herein by reference. The Guerbet alcohol prepared comprised a mixture having the following composition:

| | |
|---|---|
| $C_{22}H_{45}OH$ | 3.0% weight |
| $C_{24}H_{49}OH$ | 44.7% weight |
| $C_{26}H_{53}OH$ | 25.3% weight |
| $C_{28}H_{57}OH$ | 13.1% weight |
| $C_{30}H_{61}OH$ | 2.4% weight |

One hundred grams of this mixture were mixed with 3.5 gm of the silicic acid described in Example 1 and processed as described in Example 1. The resulting product had a viscosity of 160 mPa.s at 20° C.

EXAMPLE 8

For a technical batch, 6,000 gm of Eutanol ®G were transferred to an agitator vessel with a capacity of 10 liters. 210 gm of Aerosil ®R972 were added over a period of two minutes. During the addition, the mixture was intensively agitated with a Pendraulik agitator equipped with a toothed disk with a diameter of 60 mm, at 3,700 rpm. After the addition of the Aerosil, agitation was continued at the same speed for two more minutes. Then the batch was transferred to a 10-liter flask and heated for five hours at 240° C. under a nitrogen atmosphere, with agitation with a propeller agitator (400 rpm). The resulting liquid product had a viscosity (Brookfield, 20° C.) of 152 mPa.s.

EXAMPLE 9

In this technical batch, a 30-liter agitator vessel was used and 12 kg of Eutanol ®R 972 were transferred to it. This was reacted with 1.08 kg of Aerosol ®R972 within five minutes with agitation (agitator by Ekato KG, Schopfheim, Federal Republic of Germany; toothed disk with 180 mm diameter, rpm 1,000). After the addition was complete, the mixture was agitated for another five minutes at 1,000 rpm. Then the speed was increased to 1,500 rpm for another five minutes. Thereafter the mixture homogenized by this method was transferred into two three-neck flasks with a capacity of 10 liters, respectively, and heated to 240° C. for five hours under a nitrogen atmosphere with agitation (propeller agitator, 400 rpm). The resulting liquid mixture had a viscosity (Brookfield, 20° C.) of 500 mPa.s.

The examples describing the preparation of the powdered antifoaming agent according to the invention follow.

EXAMPLES 10, 11 AND 12

Different amounts of sodium tripolyphosphate (Thermphos ®L, commercial product of Hoechst AG) were placed in a laboratory kneading machine with heatable working bowl and a capacity of 0.75 liter (by Janke & Kunkel, Staufen/Breisgau, Federal Republic of Germany) and heated to 90° C. Then various amounts of the alcohol/silicic acid mixture according to Example 8, which are given below, were added with mixing. Subsequently, the various amounts also given below, of a paraffin with a congealing point of 68° to 72° C. (commercial product by Merck), which was liquefied by heating to 90° C., were added. Mixing was continued for 15 minutes at 90° C. Then the mixture was cooled to room temperature within about 20 minutes with continued mixing.

TABLE 1

| Example | Sodium tripolyphosphate (Parts by Weight) | Alcohol/Silicic Acid Component From Example 8 (Parts by Weight) | Wax (Paraffin CP 68 to 72° C.) (Parts by Weight) |
| --- | --- | --- | --- |
| 10 | 88 | 6 | 6 |
| 11 | 82 | 6 | 12 |
| 12 | 76 | 12 | 12 |

The total amount of the components in each example was 225 grams.

The products of the process from these examples were obtained in the form of free-flowing powders. The products were analyzed to determine the homogeneity. For this purpose, an exactly weighed amount was dissolved in water and the organic substance was extracted with n-hexane. After the removal of the hexane, the total amount and hydroxyl number of the residue were determined. The analytical results showed that the branched alcohol 2-octyldodecanol and the paraffin wax were homogeneously distributed on the solid carrier material.

EXAMPLES 13, 14 AND 15

These examples describe the preparation of less preferred products with the use of a paraffin wax with a congealing point of 57° to 60° C. (commercial product by Merck). The remaining process was the same as in the preceding Examples 10 to 12, sodium tripolyphosphate was also used as a carrier and an alcohol/silicic acid mixture according to Example 8 was employed. Consequently, the resulting products had the following composition:

TABLE 2

| Example | Sodium tripolyphosphate (Parts by Weight) | Alcohol/Silicic Acid Component From Example 8 (Parts by Weight) | Wax (Paraffin CP 57 to 60° C.) (Parts by Weight) |
| --- | --- | --- | --- |
| 13 | 88 | 6 | 6 |
| 14 | 82 | 6 | 12 |
| 15 | 76 | 12 | 12 |

The total amount of the components was 225 grams.

Adequate degrees of foam control were reached only with comparatively high concentrations with these products in the application technology tests (see Example 24).

EXAMPLES 16, 17 AND 18

These examples describe the preparation of the powdered antifoaming agents according to the invention, proceeding according to an also preferred variant of the process and mixing first the liquid alcohol/silicic acid mixture of component (a) with the wax component (b) liquefied by heating and only then combining it with the heated, powdered carrier. The components also used in Examples 10, 11 and 12 are used in the amounts and quantative proportions given there. The mixing process of the liquid premix of components (a) and (b) with carrier (c) took also 15 minutes. The the mixture was cooled and analyzed as described. Composition of the product of the process according to Examples 16, 17 and 18:

TABLE 3

| Example | Sodium Tripolyphosphate (Parts by Weight) | Alcohol/Silicic Acid Component From Example 8 (Parts by Weight) | | Wax (Paraffin CP 68 to 72° C.) (Parts by Weight) |
| --- | --- | --- | --- | --- |
| 16 | 88 | 6 | + | 6 |
| 17 | 82 | 6 | + | 12 |
| 18 | 76 | 12 | + | 12 |

The total amount of the components was 225 grams.

Good degrees of foam control were obtained with the products prepared by this method.

EXAMPLES 19, 20 AND 21

These examples describe the preparation of products according to the invention analogous to Example 10, but with the alcohol/silicic acid mixture of Example 9. However, the following waxes with higher congealing points were used instead of the paraffin wax 68° to 72° C. used in Example 10:

Example 19

A paraffin wax with the congealing point 78° C. (Multiwax ML ® by Witco), mixing temperature 95° C.;

Example 20

A paraffin wax with the congealing point 93° C. (Multiwax M 200 ® by Witco), mixing temperature 110° C.;

Example 21

A paraffin wax with the congealing point 96° to 100° C. (Veba-Wachs ®SH105), mixing temperature 110° C.

Good foam-inhibiting effects were also observed with the resulting products of the process. Whereas in the case of Examples 19 and 20, application concentrations corresponding to 0.05% by weight of component (a) and 0.05% by weight of component (b) were adequate, twice these amounts were needed of the product according to Example 21 to obtain comparable degrees of foam control.

EXAMPLE 22

This example describes the preparation of an antifoaming agent according to the invention analogous to Example 16. First, the alcohol/silicic acid mixture (a) (6 parts by weight) was mixed with the liquefied wax with CP 68° to 72° C. (b) (6 parts by weight), and then this mixture was added to the heated carrier (c) (88 parts by weight); total amount 225 gm. The product of Example 9, consisting of 12,000 gm of Guerbet alcohol and 1,080 gm of Aerosil ® was used as alcohol/silicic acid mixture.

The sodium tripolyphosphate utilized as carrier component in Examples 10 to 22 was replaced by calcined sodium sulfate and by spray- and drum-dried sodium silicate powders. In addition, a spray-dried powder of the approximate composition of 32% by weight sodium tripolyphosphate, 45% by weight of sodium sulfate, 11% by weight of sodium silicate ($Na_2O.2SiO_2$), and 12% by weight of water was used as carrier. The resulting antifoaming powders also possess good application characteristics.

EXAMPLE 23

This example describes the preparation of an antifoaming agent based on liquid paraffin, paraffin wax and silicic acid that was made hydrophobic, which is known from the European disclosure specification 000 216. For this purpose, 300 gm of liquid paraffin (viscosity 192 mPa.s at 20° C.) were reacted with 18 gm of Aerosil ®972 with intensive agitation (Pendraulik agitator, toothed disk 60 mm diameter, 3,700 rpm). After the completed addition, the batch was homogenized for 15 minutes at the same rpm and then heated to 240° C. for five hours under a nitrogen atmosphere with normal agitation (propeller agitator, 400 rpm). Subsequently, an amount of 225 gm of 88 parts by weight of sodium tripolyphosphate was mixed at 90° C. with a mixture consisting of 6 parts by weight of the paraffin/Aerosil dispersion prepared as described above and 6 parts by weight of a paraffin wax with the congealing point 68° to 72° C. and mixed in a 0.75-liter laboratory kneading machine for 20 minutes at this temperature. Then, the mixture was cooled to room temperature with mixing within about 20 minutes. The obtainable foam inhibition corresponds approximately to that achieved with the antifoaming agents according to the invention that contain a wax with a congealing point below 60° C.

EXAMPLE 24

The products of Examples 10 to 23 were used together with a test washing agent without foam inhibitor for the determination of the foam-inhibiting effect.

This test washing agent had the following composition:

| Component | Percent by Weight |
|---|---|
| n-Dodecylbenzene sulfonate-Na—salt | 7.0 |
| Tallow fatty alcohol + 14 EO | 2.5 |
| Sodium tripolyphosphate | 40.0 |
| Waterglass ($Na_2O:SiO_2 = 1:3.35$) | 3.5 |
| Sodium perborate-tetrahydrate | 24.0 |
| Magnesium silicate | 2.5 |
| Ethylenediaminetetraacetate-Na—salt | 0.2 |
| Sodium carboxymethyl cellulose | 1.0 |
| Optical brightener | 0.3 |
| Sodium sulfate and water | balance |

The concentration of foam inhibitor in the test washing agent was from 0.1 to 0.4% by weight, as indicated, with respect to the sum of the quantitative proportions of component (a) and (b) for the products according to the invention and calculated for the sum of the quantitative proportions of the liquid paraffin and the paraffin waxes for the known comparison product.

The detergents were used in a normal washing cycle with heating up to 95° C. with presoaking and clear rinsing in drum-type washing machine (Miele W 433). The machine was loaded with 3.5 kg of clean household linen, and the water hardness was only 3° dH; that is, conditions which favored strong foam formation were selected. The amount of detergent was 100 gm each for presoaking and clear rinsing.

To determine the foaming behavior, the height of the suds was checked through the sight glass of the front door of the washing machine and graded according to the following scale:

| | |
|---|---|
| No suds | 0 |
| ¼ height of sight glass | 1 |
| ½ height of sight glass | 2 |
| ¾ height of sight glass | 3 |
| 4/4 height of sight glass | 4 |
| Suds in the filler inlet | 5 |

When the washing machine overflowed, the liquor loss was weighed.

The foaming behavior of the detergent with the indicated concentration of the foam controlling additives according to the invention, or comparison product, and control run for a washing temperature of 95° C. are shown in the following Table 4.

TABLE 4

| Example | Alcohol/Silicic Acid Compon. (a) (% by weight) | Wax Component (b) (% by weight) | Wax Component (b) (CP °C.) | Foaming Number or Loss of Liquor in Grams |
|---|---|---|---|---|
| 10a | 0.05 | 0.05 | 68–72 | 2 |
| 10b | 0.025 | 0.025 | 68–72 | 4 |
| 11 | 0.05 | 0.1 | 68–72 | 3 |
| 12 | 0.05 | 0.05 | 68–72 | 4 |
| 13 | 0.2 | 0.2 | 57–60 | 4 |
| 14 | 0.2 | 0.4 | 57–60 | 2 |
| 15 | 0.3 | 0.3 | 57–60 | 4 |

TABLE 4-continued

| Example | Concentration of Alcohol/Silicic Acid Compon. (a) (% by weight) | Wax Component (b) (% by weight) | (CP °C.) | Foaming Number or Loss of Liquor in Grams |
|---|---|---|---|---|
| 16a | 0.05 | 0.05 | 68–72 | 4 |
| 16b | 0.025 | 0.025 | 68–72 | 4 |
| 17 | 0.05 | 0.1 | 68–72 | 4 |
| 18 | 0.05 | 0.05 | 68–72 | 3 |
| 19 | 0.05 | 0.05 | 78 | 3 |
| 20 | 0.05 | 0.05 | 93 | 5 |
| 21 | 0.1 | 0.1 | 96–100 | 4 |
| 22a | 0.05 | 0.05 | 68–72 | 1 |
| 22b | 0.025 | 0.025 | 68–72 | 4 |
| | Paraffin Oil/ Aerosil R 972 | | | |
| 23a | 0.1 | 0.1 | 68–72 | 70 gm |
| 23b | 0.2 | 0.2 | 68–72 | 4 |

Paraffin oil = liquid paraffin.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A free-flowing, substantially silicone-free, powdery antifoaming composition for use in aqueous systems consisting essentially of:
   (a) a liquid homogeneous mixture of a branched-chain primary $C_{16}$–$C_{30}$ alcohol and hydrophobic-reacting colloidal silicic acid with a ratio by weight of alcohol:silicic acid of 100:2 to 100:20, as obtained by heating to 100° to 240° C. with agitation for a time sufficient to obtain a homogeneous mixture,
   (b) a water-insoluble wax in a ratio by weight of (a):(b) of from 3:1 to 1:3, and
   (c) a water-soluble powdered carrier where the components (a) and (b) are present on the carrier in homogeneous distribution, the powdered carrier being present in such an amount that a free-flowing product results.

2. The antifoam composition of claim 1 wherein the ratio by weight of said alcohol to said silicic acid is from 100:1 to 100:10.

3. The antifoam composition of claim 1 or 2 wherein the ratio by weight of component (a) to component (b) is from 1:1 to 1:2.

4. The antifoam composition of claim 1 or 2 wherein said branched-chain primary $C_{16}$–$C_{30}$ alcohol is a Guerbet alcohol having the formula:

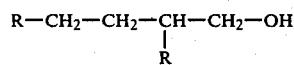

wherein each R can be the same or different and represents an alkyl having from 4 to 16 carbon atoms.

5. The antifoam composition of claim 1 or 2 wherein said component (b) consists of a natural or synthetic paraffin wax or of a mixture of waxes with a congealing point in the range of from 40° to 120° C.

6. The antifoam composition of claim 5 wherein said congealing point is in the range of from 60° to 95° C.

7. The antifoam composition of claim 1 or 2 wherein said water-soluble powdered carrier is a member selected from the group consisting of alkali metal phosphates, alkali metal polymeric phosphates, alkali metal borates, alkali metal carbonates, alkali metal silicates, alkali metal sulfates and their mixture, said carrier being compatible with the aqueous system in which foaming is to be controlled.

8. The antifoaming composition of claim 7 wherein said carrier is sodium tripolyphosphate.

9. The antifoaming composition of claim 1 or 2 wherein:
   component (a) is present in an amount of from 2 to 20% by weight,
   component (b) is present in an amount of from 2 to 20% by weight,
   component (c) is present in an amount of from 60 to 96% by weight.

10. The antifoaming composition of claim 9 wherein:
    component (a) is present in an amount of from 4 to 15% by weight,
    component (b) is present in an amount of from 4 to 15% by weight.

11. A process for the production of the antifoaming composition of claim 1 consisting essentially of the steps of:
    (a) mixing a branched-chain primary $C_{12}$–$C_{30}$ alcohol with hydrophobic-reacting colloidal silicic acid in a mixing ratio of alcohol:silicic acid of 100:2 to 100:20 under homogenizing conditions;
    (b) heating the homogenized mixture to a temperature of 100° to 240° C. with continuous stirring for one to five hours;
    (c) mixing said homogenized heated mixture with:
       (1) a water-insoluble wax in a ratio by weight of from 3:1 to 1:3 at a temperature above the congealing point of said wax, followed by mixing with a water-soluble powdered carrier at the same temperature in such an amount that upon cooling, a free-flowing product results, or
       (2) said powdered carrier in such an amount that upon cooling, a free-flowing product results, followed by mixing with a water-insoluble wax in a ratio by weight of from 3:1 to 1:3 at a temperature above the congealing point of said wax;
    (d) cooling and recovering said free-flowing substantially silicone-free, powdery antifoaming composition.

12. The process of claim 11 wherein the mixing order of step (c)(1) is followed.

13. The process of claim 11 wherein the mixing order of step (c)(2) is followed.

14. A method of regulating suds in aqueous detergent systems which comprises incorporating into the detergent an effective amount of the antifoaming composition of claim 1 before dilution to produce said aqueous detergent system.

15. The method of claim 14 wherein from about 0.15 to 15% by weight, based on the total weight of the detergent, is incorporated.

16. The method of claim 15 wherein from about 0.8 to 4% by weight, based on the total weight of the detergent, is incorporated.

* * * * *